United States Patent [19]

Gomez et al.

[11] Patent Number: 5,319,003

[45] Date of Patent: Jun. 7, 1994

[54] METHOD FOR IMPROVING THE MECHANICAL PERFORMANCE OF COMPOSITE ARTICLES

[75] Inventors: Jaime A. Gomez, Bethel, Conn.; Glenn R. Magrum, Tarrytown, N.Y.; Eric R. Pohl, Mount Kisco, N.Y.; Frederick D. Osterholtz, Pleasantville, N.Y.; Joshua B. Sweeney, Dobbs Ferry, N.Y.; Leonard J. Adzima, Pickerington, Ohio; Martin C. Flautt, Granville, Ohio; Paul R. Krumlauf, Thornville, Ohio

[73] Assignees: Union Carbide Chemicals & Plastics Technology Corporation, Danbury, Conn.; Owens-Corning Fiberglas Technology Inc., Toledo, Ohio

[21] Appl. No.: 954,036

[22] Filed: Sep. 30, 1992

[51] Int. Cl.5 .......................... C08K 7/02; C08K 3/40; C08F 8/00; B29D 22/00

[52] U.S. Cl. .................................... 523/222; 523/523; 523/527; 524/494; 524/495; 525/169; 525/170; 525/176; 525/194; 428/34.1; 428/36.3

[58] Field of Search ............... 523/222, 523, 527, 503, 523/504; 525/168, 169, 170, 176; 428/34.1, 36.3; 524/494

[56] References Cited

U.S. PATENT DOCUMENTS

| | | | |
|---|---|---|---|
| 3,674,893 | 7/1972 | Nowak et al. | 523/400 |
| 3,810,863 | 5/1974 | Hatton, Jr. et al. | 525/170 |
| 3,887,515 | 6/1975 | Pennington et al. | 523/522 |
| 4,160,759 | 7/1979 | Gardner et al. | 525/166 |
| 4,161,471 | 7/1979 | Kassal | 525/169 |
| 4,255,302 | 3/1981 | Adams et al. | 525/524 |
| 4,263,199 | 4/1981 | Atkins | 525/170 |
| 4,288,571 | 9/1981 | Comstock et al. | 525/170 |
| 4,421,806 | 12/1983 | Marks et al. | 428/36 |
| 4,525,498 | 6/1985 | Atkins et al. | 523/511 |
| 4,626,570 | 12/1986 | Gardner | 525/12 |
| 4,946,721 | 8/1990 | Kindervater et al. | 428/36.3 |
| 5,004,765 | 4/1991 | Atkins et al. | 523/434 |
| 5,009,941 | 4/1991 | Pollet et al. | 428/363 |
| 5,015,701 | 5/1991 | Domeier | 525/331 |
| 5,055,119 | 10/1991 | Flautt et al. | 65/11.1 |
| 5,077,326 | 12/1991 | Shibata et al. | 523/527 |
| 5,091,242 | 2/1992 | Chung | 428/237 |

OTHER PUBLICATIONS

Atkins, K. E., "Low Profile Behavior", *Polymer Blends*, R. D. Paul and S. Newman, eds., Academic Press 2, 391 (1978).

Barron, D. L., D. H. Kelley and L. T. Blankenship, "Testing: Metallurgical Method Speeds Fatigue Testing of Plastic", *Plastics Engineering*, May 1989, pp. 37–40.

Siebert, A. R., C. D. Guiley and D. R. Egan, et al., "New Approach to Enhance Toughness Properties of Vinyl Ester Resins", *47th Annual Conference*, Composites Institute, the Society of the Plastics Industry, Inc., Feb. 3–6, 1992, Session 17-C/1–10.

*Primary Examiner*—Paul R. Michl
*Assistant Examiner*—Tae H. Yoon
*Attorney, Agent, or Firm*—W. K. Volles

[57] ABSTRACT

A process for making a composite article having improved mechanical properties such as fatigue life, which process comprises contacting at least one continuous filament with a mixture comprising a resin and a strain relieving polymer.

11 Claims, No Drawings

METHOD FOR IMPROVING THE MECHANICAL PERFORMANCE OF COMPOSITE ARTICLES

FIELD OF THE INVENTION

The present invention relates to a process for making a composite article containing a continuous filament. More particularly, the present invention relates to a process for improved mechanical properties, such as fatigue lief, which process comprises contacting at least one continuous filament with a mixture of a resin and a strain relieving polymer.

PRIOR ART

In the manufacture of composite article such as pipes, cases, reaction vessels, cones, tubes and bottles, it is conventional practice to impregnate continuous filaments with a resin, to form the impregnated continuous filaments into a shaped article, and then to cure the resin to form the composite. Common processes for making composites are filament winding and protrusion.

Filament winding is a process in which continuous filaments are impregnated with a resin, would onto a mandrel to build the desired shape and thickness, and cured. By "mandrel" is meant a tool used in filament winding on which bands of fibers are deposited into filamentary patterns to form layers. Upon curing of the resin, the composite so shaped is removed from the mandrel and applied to its intended use.

The pultrusion process generally consists of pulling continuous filaments through a resin bath or impregnator and then into preforming fixtures (dies) in which a section of continuous filament impregnated with resin is partially shaped and excess resin and/or air are removed. Then the section is pulled through in heated dies in which it is cured.

PRIOR ART

There is an on-going need for these composite articles to have a long working life i.e., improved fatigue life as measured by such tests as cyclic fatigue in which the composite article is subjected to repetitive loading cycles. There is another on-going need for these composite articles to sustain higher working pressures, i.e. the pressure in which the composite article is subjected to increasing pressures until it fails.

In general, the industry focus of its research into improving the working life of a composite article has been in the area of strengthening the bond between continuous filaments and resin. In polyaramid and carbon fibers this has been accomplished by means of plasma treatment. In glass fibers this has been achieved in part, by means of fiber size formulations and, in particular, emphasis on the silanes employed in size formulations. By "size" is meant a coating, generally comprising film former, lubricant, thickening agent, anti-static agent and coupling agent, such as a silane, applied to the continuous filament to protect its surface, impart desired fiber handling properties and improve the bonding between fiber and resin.

Research that has been done on improving the resin or resin system has centered on changing the chemical structure of the resin that is used to impregnate the continuous filaments. In part, this has been due to the fact that the resin employed is determined in large measure by its application technique and the end-use of the composite article.

In Bulk Molding Compounds (BMC) and Sheet Molding Compounds (SMC) research has been conducted on additives to the resin to improve the surface appearance properties of chopped glass fiber and/or particulate filler reinforced resin. The additives, which are called "low profile additives," are particularly useful in improving surface appearance when added to thermosetting resins, such as polyester or vinyl ester. Low profile additives prevent composite shrinkage that normally occurs during the curing of the resin and are not employed to improve strength and/or fatigue life of the composite. The addition of low profile additives to vinyl ester and/or polyester resin reinforced with chopped glass fibers and/or particulate filler, have little positive effect, and often slightly detrimental effect on the strength properties, such as tensile or flexural strength, of BMC and SMC composite articles.

Another approach to enhance toughness Properties of chopped fiber reinforced vinyl ester or polyester used in BMC and SMC applications is to add rubber compounds to improve impact strength, but these compounds had little or no effect on the tensile or flexural strength of the composite articles.

Although the mechanism by which low profile additives prevents shrinkage in BMC and SMC applications is still under study, it is well documented that during the curing of the resin, voids are formed in the resin and low profile additive phases. The failure mechanism for BMC and SMC composites under stress is the propagation of a crack originating at an imperfection or flaw. Voids are flaws in the composite. Thus, it has been reasonable to expect that low profile additives do not improve the strength properties of BMC and SMC chopped filament reinforced composites. It was, therefore, unexpected when the structurally similar strain relieving polymers of this invention were found to substantially improve burst strength and cyclic fatigue of continuous filament reinforced resin composites.

SUMMARY OF THE INVENTION

The present invention provides a process for making a composite article which process comprises contacting at least one continuous filament with a mixture comprising a resin and a strain relieving polymer. The present invention provides a composite article having enhanced low weight, high strength, high fatigue resistance and no or minimal loss in corrosion resistance.

DETAILED DESCRIPTION OF THE INVENTION

The present invention provides an improvement in manufacturing processes of composite articles by adding a strain relieving polymer to the resin in the resin vessel so that the continuous filament is impregnated with the mixture of the resin and strain relieving polymer prior to or during its being wound or shaped.

CONTINUOUS FILAMENT

Continuous filaments or fibers which are employed in the process of the present invention are well known in the art for manufacturing composite structures. Some examples of these continuous filaments include polyaramid fiber, graphite fiber (also known as carbon fiber), glass fiber, boron fiber, and combinations thereof. As used herein, and especially as used in the claims, "filament" means a single filament or fiber as well as a multiplicity of fibers which is also known as a strand.

Typically, the polyaramid fiber that is employed in the process of the present invention has a tensile strength of about 2.75 to 3.8 GPa. Polyaramid fibers are typically purchased in the form of commercially available filament yarns 20 to 805 Tex with 125 to 5000 filaments. The diameter of the fibers can range from about 10 to 12 micrometers. Polyaramid fibers are readily commercially available and can be obtained as Kevlar ® from E. I. duPont de Nemours, Inc. (Wilmington, Delaware), PABH-T X-500 from Monsanto Co. (St. Louis, Missouri), and AFT-200 from Bayer AG (Germany).

Graphite fibers can also be used in the practice of the process of the present invention. Graphite fiber generally has a tensile strength of about 2 to 3 GPa. The Young's modulus of the fiber is about 250 to 580 GPa. The diameter of typically used graphite fibers ranges from about 7 to 8 micrometers. Graphite fibers, like polyaramid fibers, are typically used in the form of roving or tape which is commercially available in various conventional widths. Roving typically comprises about 125 to 5000 fibers. The graphite fiber is readily commercially available and can be obtained as HTS ® from Hercules Inc. (Wilmington, Delaware), T-300(R) from Union Carbide Chemicals and Plastics Company, Inc. (Danbury, Connecticut), and 6T from Great Lakes Corporation (Briarcliff Manor, New York).

Glass fiber material can be used and is preferred in the practice of the process of the present invention. The preferred glass fiber composition is selected from the group consisting of E-type, S-type, A-type and C-type. Most preferably the glass fiber is E- or S-type. The glass fiber used in this invention preferably have tensile strengths of approximately 2.9 to 4.4 GPa and Young's modulus of approximately 70 to 87 GPa. The glass can be sized (also known as "presized") or unsized. Presized glass fiber is readily commercially available and is preferred in the practice of the present invention. Glass fiber for use in the Present invention is available as roving in yields from 675 to 113 yards per pound with fiber diameters from 6 to 25 micrometers, and preferably with a fiber diameter of 12 to 20 micrometers, and most preferably with a fiber diameter of 14 to 18 micrometers. Glass fibers are readily commercially available as 366 M-450 from Owens Corning Fiberglass (Toledo, Ohio), 2002 M-250 from PPG Industries Inc. (Pittsburgh, Pennsylvania) and 625 Vetrotex-Certain-Teed ® from Vetrotex SA (France). Glassfibers that are most preferred in the process of the present invention are prepared by an in-line drying process as described in U.S. Pat. No. 5,055,119 and improved processes thereof. These most preferred glass fibers are hereinafter referred to as "in-line dried glass fibers."

Glass fibers are conventionally manufactured by discharging a plurality of molten glass streams from a heated bushing, attenuating the plurity of glass streams into a plurality of fibers, and passing the fibers through an applicator to apply an aqueous based size to the fibers. Afterwards the fibers are gathered into a strand at a gathering shoe and wound on a collet to produce a glass fiber package. The package is dried to evaporate the water from the aqueous-based size. An example of such glass fiber is OCF 366 available from Owens Corning Fiberglas.

The in-line drying process of U.S. Pat. No. 5,055,119 is an energy efficient process for forming glass fiber packages which are free of migration. In the in-line drying process air from around the fiber forming bushing is passed beneath the bushing whereby it is heated by bushing heat and the heated air is then drawn into a chamber through which the glass fibers pass in heat transfer contact with the heated air. The heat transfer causes the water or solvent in the applied size to be evaporated and results in a migration free glass fiber package.

Boron filaments can be employed in the process of the present invention and are usually fabricated by deposition of boron on heated tungsten wires. They have tensile strengths of approximately 3 GPa and a Young's modulus of approximately 400 GPa. Boron filaments can be purchased from Avco Systems Division (Lowell, Massachusetts).

Ceramic fibers can be employed in the process of the present invention and are made from metal oxides and possess combinations of properties previously unknown. They have extremely high thermal stability (1350° to 1650° C.) combined with a high modulus of elasticity and chemical resistance. The fibers may be formed by the decomposition of silicon hydride on carbon fibers. Ceramic fibers are commercially available as Nextel ® from 3M Co. (St. Paul, Minnesota), as FP ® from I. E. duPont de Nemours, Inc., and Fiberfrax ® from Sohio Engineering Materials Co (Niagara Falls, New York).

RESIN

In the process of the present invention at least one continuous filament is coated with a resin. The resin is selected from the group consisting of an unsaturated polyester, a vinyl ester, and mixtures thereof.

Unsaturated polyester resins which can be employed in the process of the present invention are well known and disclosed in U.S. Pat. Nos. 4,528,498; 4,375,215; 4,288,571; 4,284,736; and 4,263,199. In general, polyester resins are prepared by condensing an ethylenically unsaturated dicarboxylic acid or anhydride or mixtures thereof with a dihydric alcohol or mixtures of dihydric alcohols. Examples of unsaturated polyester resins include Hetron ® and Aropol ® available from Ashland Chemical Co. (Ashland, Ohio).

Vinyl ester resins which can be employed in the process of the present invention are well known an are disclosed in U.S. Pat. Nos. 3,367,992; 3,066,112; 3,179,623; 4,673,706 and 5,015,701. Typically, vinyl ester resins are thermosetting resins that consist of a polymer backbone (B) with an acrylate (R=H) or methacrylate (R=CH$_3$) termination, schematically represented by the following:

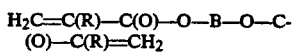
$H_2C=C(R)-C(O)-O-B-O-C-(O)-C(R)=CH_2$

The backbone component of vinyl ester resin can be derived from a variety of well known resins such as, for example, an epoxide resin, polyester resin, or a urethane resin. Those based on epoxide resins are widely used commercially and, hence, are especially preferred in the process of the Present invention.

Vinyl ester resins employed in the process of the present invention are well known and are generally prepared by reacting at least equivalent proportions of a polyepoxide resin and an unsaturated monocarboxylic acid wherein

$C(O)-O-CH_2-CH(OH)-CH_2-O-$ linkages are formed and the resulting resin has terminal, polymerizable unsaturated groups. Examples of suitable vinyl ester resins include, for example, VE8303 from Interplastics Corporation (Vadnais Heights, Minnesota) and Hetron ® 925 from Ashland Chemical Co. (Ashland, Ohio).

STRAIN RELIEVING POLYMER (SRP)

In the process of the present invention a strain relieving polymer is mixed with the resin. The strain relieving polymer and resin are mixed or blended, typically under ambient conditions, by any means known to those skilled in the art. Such mixing or blending means can include, for example, agitating by stirring, shaking or a combination thereof.

Strain relieving polymers as defined herein are thermoplastic polymers which are soluble in (i) vinyl monomers and (ii) mixtures of vinyl monomers and thermosetting resins. In general, such thermoplastic polymers phase separate during the curing process. In particular, the thermoplastic polymers should be amorphous, with low glass transition temperatures, and molecular weights between 1,000 to 500,000 g/mol and preferably between 10,000 and 100,000 g/mol. The vinyl monomers are unsaturated monomers that are copolymerizable with the thermosetting resin. The preferred vinyl monomers are alkenyl aromatic monomers including styrene, vinyl toluene, alpha-methyl styrene and the like.

Strain relieving polymers which can be employed in the process of the present invention can be selected form the group consisting of acrylics, including polymethylmethacrylate, polymethylacrylateacrylate copolymer, methylmethacrylate-styrene copolymer, polycaprolactones, polystyrene and stryene copolymers, polyurethanes, polyvinylacetates, vinyl chloride-vinyl acetate copolymers, saturated polyester and styrene-butadiene copolymer. Preferably, the strain relieving polymer is selected from the group consisting of poly(vinyl)acetate, polymethylmethacrylate and copolymers with other acrylates, copolymers of vinyl chloride and vinyl acetates, saturated polyesters and various blends of saturated polyesters with poly(vinyl)chloride and mixtures thereof. Most preferably, the strain relieving polymer is a poly(vinyl)acetate and a saturated polyester.

Strain relieving polymers are chosen based on the desired Properties sought in the final product as well as compatibility factors such as, for example, solubility of the strain relieving polymer in the resin and subsequent phase separation of the strain relieving polymer from the resin curing the composite. The choice of a particular strain relieving polymer for a desired application is within the skill of or may be arrived at by routine experimentation known to those skilled in the art.

Poly(vinyl)acetates suitable for use as strain relieving polymers in the process of the present invention are disclosed in U.S. Pat. Nos. 3,718,714; 4,284,736; 4,288,571; and 3,842,142. They are commercially available, for example, as Neulon-T, LP-90 and LP-40A from Union Carbide Chemicals and Plastics Company Inc., and CX-1185 and CX-1752 from Owens Corning Fiberglas.

Polymethylmethacrylate and copolymers with other acrylates suitable for use as strain relieving polymers in the process of the present invention are described in U.S. Pat. Nos. 3,701,748; 3,722,241; 4,463,158; 4,020,036 and 4,161,471. Illustrative examples of such strain relieving polymers include, for example, polymethylmethacrylates available as Perspex ® from ICI Americas, Inc. (Wilmington, Delaware), polymethylacrylate-acrylate copolymers such as Paraplex ® P-681 from Rohn & Haas Company, Inc. (Philadelphia, Pennsylvania), and P-701 from Owens Corning Fiberglas; and methylmethacrylate-styrene copolymers available as Diakon ® from ICI.

Copolymers of vinyl chloride and vinyl acetate suitable for use as strain relieving polymers in the process of the present invention are disclosed in U.S. Pat. Nos. 4,284,736 and 3,721,642. They are commercially available as Vinnol ® K from Wacker Chemie (Germany), Vestolit BAU ® from Huls (Germany) and Geon ® from B. F. Goodrich (Akron, Ohio).

Polyurethanes suitable for use as strain relieving polymers in the process of the present invention are disclosed in U.S. Pat. Nos. 4,035,439 and 4,463,158; British Patent 1,451,737; and European Patent 074,746. They are commercially available as Adiprene ® from Uniroyal (Middlebury, Connecticut) and PBA-2210 from ICI Americas, Inc.

Polystyrene and certain copolymers of certain monomers suitable for use as strain relieving polymers in the process of the present invention are disclosed in U.S. Pat. Nos. 3,503,921 and 3,674,893; Netherlands Patent No. 70-15386; and German Patent No. 2,252,972. They are readily commercially available as Polystyrol ® from BASF AG (Parsippany, New Jersey) and as Styron ® from Dow Chemical Co. (Midland, Michigan).

Polycaprolactones suitable for use as strain relieving polymers in the process of the present invention are disclosed in U.S. Pat. Nos. 3,549,586 and 3,688,178. They are readily commercially available as LPS-60 from Union Carbide Corporation.

Saturated polyesters and various blends of saturated polyesters with poly(vinyl)chloride are disclosed in U.S. Pat. Nos. 3,489,707; 3,736,728; and 4,263,199; Japanese Patent No. 4,601,783; and Netherlands Patent No. 70-14568. They are commercially available as Melinar ® and Hexaplas ® PPA from ICI Americas, Inc.

These strain relieving polymers when mixed or blended with a resin in any desired amount and formed into a composite article, result in an article having improved fatigue-life as measured by cyclic fatigue and higher working pressures as measured by burst strength and split-D test. In general, the amount of the strain relieving polymer ranges from 0.1 to 24.0 percent, preferably 2 to 12 percent, most preferably 4 to 8 percent by weight based upon the total amount by weight of the resin and strain relieving polymer.

CURING CATALYST

Generally, a curing catalyst or initiator such as, for example, a free radical initiation catalyst is employed to cure the resin by initiating a crosslinking reaction. Such curing catalysts are well known in the art. While an organic peroxide is typically employed, it is also possible to employ organic hydroperoxides and azo compounds. The amount of initiator employed will generally range from about 0.1 to about 4 parts by weight, and preferably 1 to 2 parts by weight, of the initiator per 100 parts by weight of the mixture of resin and strain relieving polymer.

Illustrative of some peroxides useful as catalysts in this invention include the dialkyl and diacyl peroxides. The dialkyl peroxides have the general structure R-OO-R', where R and R' can be the same or different primary, secondary or tertiary alkyl, cycloalkyl, aralkyl, or heterocyclic radicals. Included in this group of peroxides which are suitable for use in this invention are dicumyl peroxide, di-t-butyl peroxide, t-butylcumyl peroxide and 2,5-dimethyl-2,5-bis (t-butyl peroxy) hexane.

Diacyl peroxides have the general structure RC(O)OOC(O)R' where R and R' are the same or different alkyl, cycloalkyl, aralkyl, aryl or heterocyclic radicals. Illustrative of some diacyl peroxides suitable for use in this invention are dilauroyl peroxide, dibenzoyl peroxide, dicetyl peroxide, didecanoyl peroxide, di-(2,4-dichlorobenzoyl) peroxide, diisononanoyl peroxide and 2-methylpentanoyl peroxide. Additional peroxides useful in accordance with this invention include methyl ethyl ketone peroxide, cyclohexanone peroxide, and the like, as well as the particularly preferred peresters, such as t-butyl peroctoate and t-butyl perbenzoate.

As will be evident to those skilled in the art, any organic peroxide or other free radical or sources thereof which are useful in crosslinking polymers or initiating polymerization are encompassed in the present invention.

The basis for choice of free radical initiators for use in this invention include such things as the half life of the initiator at the mixing and/or curing temperature of the selected resin in the system or employed in the making of a composite article.

Examples of hydroperoxides which are suitable for use in the present invention include t-butyl hydroperoxide, cumyl hydroperoxide, 2,5-dimethyl-2,5- dihydroperoxyhexane, and diisopropylbenzenehydroperoxide.

Examples of some azo compounds which are suitable for use as free radical initiators to this invention include diazoaminobenzene, N,N'-dichloroazodicarbonamide, azo-dicarboxylic acid diethyl ester, 1-cyano-1-(t-butylazo) cyclohexanone and azo-bis-(isobutyronitrile).

OTHER ADDITIVES

Optionally, other components can be included along with the resin and strain relieving polymer in the resin bath or vessel. Such components can include, for example, fillers, pigments, chopped strands, release agents and plasticizers. Fillers can include, for example, clay, hydrated alumina, silica, calcium carbonate and others known in the art. Pigments can include, for example Sicotan ® Yellow K from BASF AG and Bayferrox ® from Bayer AG. Release agents can include, for example, zinc stearate, calcium stearate and others known to the art. Plasticizers can include, for example, phthalates such as Kodaflex ® from Eastman Kodak Products (Rochester, New York).

There are also special additives commonly employed in the manufacture of composite articles and these include halogen-containing flame retardants, such as tetrabromobisphenol A and derivatives, phosphorous-containing flame retardants such as triethyl phosphate, and inorganic flame retardants such as antimony trioxide, magnesium hydroxide, and aluminum hydroxide.

A thickening agent can be employed, such as the oxides and/or hydroxides of magnesium and calcium, which are commonly used to modify viscosity as required. Other conventional special purpose additives include inhibitors and retardants, such as hydroquinone, p-benzoquinone for the polyester component and t-butylcatechol used as a monomer inhibitor as well as compounds such as toluquinone and mono-t-butylhydroquinone.

The following examples are set forth for illustrative purposes only and are not to be construed as unduly limiting of the present invention. All parts and percentages are by weight unless otherwise specified.

EXAMPLES

Preparation of Filament Wound Pipes

Filament wound pipes were fabricated by passing a glass fiber strand through a resin bath containing a thermosetting resin, styrene and a strain relieving polymer in amounts designated in the tables. Fibers so impregnated were wound onto a mandrel to form a tube or pipe and placed in an oven at room temperature. The oven was heated to 82.2° C. (180° F.) in 6 minutes, and the mandrels containing the pipe were heated at that temperature for an additional 6 minutes. The temperature of the oven was than raised to 148.9° C. (300° F.) in about 15 minutes and the mandrels with pipe were heated at that temperature for 15 minutes. The oven was allowed to cool to room temperature before the pipes were removed from the oven and separated from the mandrel. After the pipe was dislodged from the mandrel, it was cut into 61 cm segments each having a diameter of 57 mm. The wall thickness was measured for each pipe, and it was approximately 1.27 mm thick.

Fatigue Life (Cycles to Failure)

Fatigue life of the pipe or tube was tested according to ASTM D-2143. Each pipe section was fitted on the outside of the pipe with three electrical detectors to sense the presence of water. The pipes were filled with water and mounted on a cyclic fatigue tester.

The numbers of cycles for water to penetrate to the outer wall of the pipe was measured by each detector. After all the detectors failed, an average number of cycles was taken for each pipe section. Pipe sections were tested at different pressures. The pipe section's minimum wall thickness was determined according to ASTM D-2992. The pressures, minimum pipe wall thicknesses and pipe diameters were used to calculate hoop stress according to the following equation:

$$\text{Hoop Stress} = \frac{\text{Pressure} \times \text{Pipe Diameter}}{2 \times \text{Pipe Wall Thickness}}$$

The hoop stress is defined as the tensile stress in the wall of the piping product in the circumferential direction due to internal pressure. The linear regression of the logarithm of the hoop stress versus the logarithm of number of cycles was used to calculate the number of cycles to weep at a hoop stress of 131 MPa (19,000 psi), a commonly accepted method for reporting fatigue life in the art of continuous fiber reinforced pipe.

Burst Strength

Pipes were tested for burst strength according to ASTM D-1599. Accordingly, a pipe section was placed in a pressurizing machine and increasing pressure was applied until the pipe section failed as evidenced by a weep, tear or split. A weep is defined as a visible drop of water appearing on the outside surface of the pipe. The maximum sustainable pressure was recorded. The maximum sustainable pressure, minimum wall thickness and pipe diameter were used to calculate burst strength according to the following equation:

$$\text{Burst Strength} = \frac{\text{Maximum Pressure} \times \text{Pipe Diameter}}{2 \times \text{Pipe Wall Thickness}}$$

Split-D-Test

Wet strength retention as well as corrosion properties were measured by submerging 57 mm diameter pipe rings of 25.4 mm length pipe in a variety of solutions for a 10-day period and then pulling the pipe rings as described in ASTM D-2290.

Materials

Glass #1 is a glass fiber produced by an oven-dried process and available as 366 OCF from Owens Corning Fiberglas.

Glass #2 is a glass fiber produced by an In-Line Dried process of U.S. Pat. No. 5,055,119 and available as 126A OCF from Owens Corning Fiberglas.

Glass #3 is a glass fiber produced by an In-Line Dried process of U.S. Pat. No. 5,055,119 and available as 144A OCF from Owens Corning Fiberglas.

Glass #4 is a glass fiber produced by an In-Line Dried process of U.S. Pat. No. 5,055,119 and available as 144B OCF from Owens Corning Fiberglas.

Glass #5 is a glass fiber produced by an In-Line Dried process of U.S. Pat. No. 5,055,119 and available as 167F OCF from Owens Corning Fiberglas.

Glass #6 is a glass fiber produced by an In-Line Dried process of U.S. Pat. No. 5,055,119 and available as 167K OCF from Owens Corning Fiberglas.

Glass #7 is a glass fiber produced by an In-Line Dried process of U.S. Pat. No. 5,055,119 and available as 4907-144B OCF from Owens Corning Fiberglas.

Resin A is a vinyl ester resin diluted in styrene available as Corezyn ™ 8303 from Interplastics Corporation Inc.

Resin B is an unsaturated polyester resin diluted in styrene available as OCF E-701 from Owens Corning Fiberglas.

SRP I is a poly(vinyl)acetate (acetic acid ethenyl ester, homopolymer in styrene) strain relieving polymer available as LP-90 from Union Carbide Chemicals and Plastics Company Inc.

SRP II is a poly(vinyl)acetate (methyl methacrylate and methacrylic acid terpolymer in styrene) strain relieving polymer available as OCF CX-1185 from Owens Corning Fiberglas.

SRP III is a poly(vinyl)acetate (mixture of acetic acid ethenyl ester copolymer, acetic acid ethenyl ester, and epoxide ester in styrene) strain relieving polymer available as Neulon T ™ from Union Carbide Chemicals and Plastics Company Inc.

SRP IV is a poly(methyl)methacrylate strain relieving polymer available as PMMA (75,000 g/mol) from Polyscience, Inc.

SRP V is a poly(vinyl)acetate (acetic acid ethenyl ester copolymer in styrene) strain relieving polymer available as LP-40A from Union Carbide Chemicals and Plastics Company Inc.

SRP VI is a poly(methyl)methacrylate strain relieving polymer available as PMMA (25,000 g/mol) from Polyscience, Inc.

SRP VII is a cellulose acetate butyrate (28–31% acetyl, 16% butyryl) strain relieving polymer from Eastman Kodak.

SRP VIII is a polycaprolactone (2-oxepanone, homopolymer, carboxy terminated [mol. wt. 5,200 g/mole]) strain relieving polymer available as LPS 60 from Union Carbide Chemicals and Plastics Company Inc.

SRP IX is a polyester made using ethylene glycol, propylene glycol, and adipic acid in styrene strain relieving polymer available as OCF CX-1752 from Owens Corning Fiberglas.

Example 1

Filament wound pipe prepared from Owens Corning Fiberglas 366 impregnated with a mixture of vinyl ester resin (Interplastics 8303) and a strain relieving polymer (Union Carbide LP-90) was evaluated for fatigue life (cycles at a hoop stress of 131 MPa (19,000 psi)). The results are set forth in Table 1. From Table 1, it can be seen that the incorporation of a strain relieving polymer significantly improves fatigue life and hoop stress of a composite article.

TABLE 1

FATIGUE LIFE OF A CONTINUOUS GLASS FIBER REINFORCED VINYL ESTER PIPE CONTAINING VARIOUS CONCENTRATIONS OF A STRAIN RELIEVING POLYMER

| Glass Process: | Oven dried |
| Glass: | Glass #1 |
| Resin: | Resin A |
| SRP: | SRP I |
| Peroxide: | USP-245[1] |

| Composition | | | | | | |
|---|---|---|---|---|---|---|
| Glass, wt % | 72.18 | 72.18 | 72.18 | 72.18 | 72.18 | 72.18 |
| Resin, wt % | 27.54 | 27.27 | 27.00 | 26.39 | 25.50 | 24.59 |
| SRP, wt % | 0.00 | 0.28 | 0.54 | 1.06 | 2.04 | 2.95 |
| Peroxide, wt % | 0.28 | 0.28 | 0.28 | 0.28 | 0.28 | 0.28 |
| Cycles to Failure Pressure, MPa (psi) | | | | | | |
| 8.27 (1200) | 4,970 | 6,715 | 9,394 | 20,904 | 42,740 | 27,000 |
| 10.34 (1500) | 953 | 1,073 | 1,287 | 2,530 | 6,331 | 5,523 |
| 12.41 (1800) | | | | | 2,023 | 1,636 |
| awt[2], mm | 1.61 | 1.59 | 1.61 | 1.54 | 1.58 | 1.29 |
| Cycles to Failure at 131 MPa (19,000 psi) Hoop Stress | 14,250 | 29,336 | 43,881 | 53,187 | 125,528 | 264,222 |

[1] = 2,5-dimethyl-2,5-bis (2-ethyl hexoyl peroxy) hexane from Witco Chemical Corporation (Richmond, California).
[2] awt = average wall thickness, mm.

Example 2

Filament wound pipe made from in-line dried glass fiber produced according to the process disclosed in U.S. Pat. No. 5,055,119, size 126A, was impregnated with a mixture of a vinyl ester resin (Interplastics 8303) and a strain relieving polymer (Union Carbide LP-90). The pipe so produced was evaluated of fatigue life as described in Example 1. The results are set forth in Table 2.

From Table 2, it can be seen that the incorporation of a strain relieving polymer into a composite made with in-line dried continuous glass fibers according to the process described in U.S. Pat. No. 5,055,119 improved the fatigue life of that composite even more than composites made with conventional glass fibers dried in an oven, such as, for example, with OCF 366 glass.

TABLE 2

FATIGUE LIFE OF A CONTINUOUS GLASS
FIBER REINFORCED VINYL ESTER PIPES
MADE FROM VARIOUS CONCENTRATIONS OF
A STRAIN RELIEVING POLYMER AND IN-LINE
DRIED CONTINUOUS GLASS FIBERS

| | | | |
|---|---|---|---|
| Glass Process: | In-line dried | | |
| Glass: | Glass #2 | | |
| Resin: | Resin A | | |
| SRP: | SRP I | | |
| Peroxide: | USP-245 | | |

| Composition | | | |
|---|---|---|---|
| Glass, wt %: | 72.18 | 72.18 | 72.18 |
| Resin, wt % | 27.54 | 26.39 | 25.50 |
| SRP, wt % | 0.00 | 1.06 | 2.04 |
| Peroxide, wt % | 0.28 | 0.28 | 0.28 |
| Cycles to Failure Pressure, MPa (psi) | | | |
| 8.27 (1200) | 9,026 | 28,585 | 102,671 |
| 10.34 (1500) | 2,005 | 6,843 | 15,030 |
| 12.41 (1800) | 622 | 2,096 | 5,151 |
| Cycles to Failure at 131 MPa (19,000 psi) Hoop Stress | 21,521 | 78,809 | 149,482 |

Example 3

Filament wound pipe made from glass fibers was impregnated with a vinyl ester resin (Interplastics 8303) containing various concentrations of a strain relieving polymer (Union Carbide LP-90) was evaluated under dry and wet conditions for burst hoop stress. By "dry" conditions is meant that the filament wound composite is tested "as is" without prior exposure to a reagent such as water. By "wet" conditions is meant that the filament wound composite test samples were exposed to boiling water for 10 days before testing. The various glass fibers, amounts of strain relieving polymer and results are set froth in Table 3.

From Table 3, it can be seen that composites made with continuous glass fibers and strain relieving polymers have higher wet and dry burst strengths.

TABLE 3

DRY AND WET BURST STRNGTH ON COMPOSITES A
CONTAINING STRAIN RELIEVING POLYMER AND
OVEN DRIED OR IN-LINE DRIED CONTINUOUS
GLASS FIBERS

| | | | | |
|---|---|---|---|---|
| Glass Processs: | Oven dried | | | |
| Glass: | Glass #1 | | | |
| Resin: | Resin A | | | |
| SRP: | SRP I | | | |
| Peroxide: | USP-245 | | | |

| Composition | | | | |
|---|---|---|---|---|
| Glass, wt %: | 65.5 | 65.5 | 65.5 | 65.5 |
| Resin, wt % | 34.15 | 32.84 | 31.62 | 30.49 |
| SRP, wt %: | 0.00 | 1.31 | 2.53 | 3.66 |
| Peroxide, wt %: | 0.35 | 0.35 | 0.35 | 0.35 |
| Burst Strength | | | | |
| Dry Burst Strength, MPa | 466.7 | 448.5 | 516.9 | 479.0 |
| (psi) | (67,686) | (65,042) | (74,964) | (69,466) |
| Wet Burst Strength, MPa | 285.8 | 268.6 | 288.0 | 273.0 |
| (psi) | (41,452) | (38,960) | (41,773) | (39,587) |

| | | | | |
|---|---|---|---|---|
| Glass Process: | In-line dried | | | |
| Glass: | Glass #3 | | | |
| Resin: | Resin A | | | |
| SRP: | SRP I | | | |
| Peroxide: | USP-245 | | | |

| Composition | | | | |
|---|---|---|---|---|
| Glass, wt %: | 69.1 | 69.1 | 69.1 | 69.1 |
| Resin, wt % | 30.59 | 29.41 | 28.32 | 27.31 |
| SRP, wt %: | 0.00 | 1.18 | 2.27 | 3.28 |
| Peroxide, wt %: | 0.31 | 0.31 | 0.31 | 0.31 |
| Burst Strength | | | | |
| Dry Burst Strength, MPa | 545.8 | 681.1 | 738.9 | 724.9 |
| (psi) | (79,156) | (98,775) | (107,164) | (105,135) |
| Wet Burst Strength, MPa | 365.2 | 345.0 | 400.2 | 386.1 |
| (psi) | (52,965) | (50,030) | (58,047) | (55,993) |

| | | | | |
|---|---|---|---|---|
| Glass Process: | In-line dried | | | |
| Glass: | Glass #4 | | | |
| Resin: | Resin A | | | |
| SRP: | SRP I | | | |
| Peroxide: | USP-245 | | | |

| Composition | | | | |
|---|---|---|---|---|
| Glass, wt %: | 70.1 | 70.1 | 70.1 | 70.1 |
| Resin, wt%: | 29.6 | 28.46 | 27.41 | 26.43 |
| SRP, wt %: | 0.00 | 1.14 | 2.19 | 3.17 |
| Peroxide, wt %: | 0.30 | 0.30 | 0.30 | 0.30 |
| Burst Strength | | | | |
| Dry Burst Strength, MPa | 545.0 | 657.9 | 683.9 | 710.7 |
| (psi) | (79,037) | (95,417) | (99,187) | (103,070) |
| Wet Burst Strength, MPa | 347.4 | 392.9 | 399.3 | 412.9 |
| (psi) | (50,383) | (56,980) | (57,909) | (59,889) |

Example 4

The data in Table 4 show the effect of different concentrations of strain relieving polymer on cyclic fatigue of pipes made with different glass fibers. Dramatic improvements result from the use of the strain relieving polymer. For any strain relieving polymer concentration the number of cycles to failure is higher for composites made with the in-line dried glass fibers than those composites made with the oven dried glass fibers, such as OCF 366. these data also show that after a 10-day water boil test (wet test), the fatigue life retention of composites made with the in-line dried glass fibers is better than the composites made with oven dried glass fibers at any strain relieving polymer concentration.

TABLE 4

FATIGUE LIFE OF COMPOSITES MADE WITH
IN-LINE DRIED OR OVEN DRIED CONTINUOUS
GLASS FIBERS, STRAIN RELIEVING POLYMERS
AND VINYL ESTER RESIN

| | | | | |
|---|---|---|---|---|
| Glass Process: | Oven dried | | | |
| Glass: | Glass #1 | | | |
| Resin: | Resin A | | | |
| SRP: | SRP I | | | |
| Peroxide: | USP-245 | | | |

| Composition | | | | |
|---|---|---|---|---|
| Glass, wt %: | 65.5 | 65.5 | 65.5 | 65.5 |
| Resin, wt %: | 34.15 | 32.84 | 31.62 | 30.49 |
| SRP, wt %: | 0.00 | 1.31 | 2.53 | 3.66 |
| Peroxide, wt %: | 0.35 | 0.35 | 0.35 | 0.35 |
| Cycles to Failure at 131 MPa (19,000 psi) Hoop Stress | | | | |
| Dry* | 14,384 | 27,013 | 158,586 | 264,222 |
| Wet** | 22,706 | 21,702 | 7,917 | 26,821 |

| | | | | |
|---|---|---|---|---|
| Glass Process: | In-line dried | | | |
| Glass: | Glass #3 | | | |
| Resin: | Resin A | | | |
| SRP: | SRP I | | | |
| Peroxide: | USP-245 | | | |

| Composition | | | | |
|---|---|---|---|---|
| Glass, wt %: | 69.1 | 69.1 | 69.1 | 69.1 |
| Resin, wt %: | 30.59 | 29.41 | 28.32 | 27.31 |
| SRP, wt %: | 0.00 | 1.18 | 2.27 | 3.28 |

TABLE 4-continued
FATIGUE LIFE OF COMPOSITES MADE WITH IN-LINE DRIED OR OVEN DRIED CONTINUOUS GLASS FIBERS, STRAIN RELIEVING POLYMERS AND VINYL ESTER RESIN

| Peroxide, wt %: | 0.31 | 0.31 | 0.31 | 0.31 |
|---|---|---|---|---|
| Cycles to Failure at 131 MPa (19,000 psi) Hoop Stress | | | | |
| Dry* | 17,640 | 79,205 | 112,565 | 278,541 |
| Wet** | 41,526 | 126,785 | 187,142 | 211,458 |

| | |
|---|---|
| Glass Process: | In-line dried |
| Glass: | Glass #4 |
| Resin: | Resin A |
| SRP: | SRP I |
| Peroxide: | USP-245 |

| Composition | | | | |
|---|---|---|---|---|
| Glass, wt %: | 70.1 | 70.1 | 70.1 | 70.1 |
| Resin, wt %: | 29.6 | 28.46 | 27.41 | 26.43 |
| SRP, wt %: | 0.00 | 1.14 | 2.19 | 3.17 |
| Peroxide, wt %: | 0.30 | 0.30 | 0.30 | 0.30 |
| Cycles to Failure at 131 MPa (19,000 psi) Hoop Stress | | | | |
| Dry* | 13,048 | 36,343 | 128,607 | 277,093 |
| Wet** | 29,196 | 131,720 | 102,706 | 845,862 |

*as prepared
**10-day Water Boil

Example 5

The data in Table 5 show the addition of a strain relieving polymer, such as LP-90, to an unsaturated polyester resin has an even more beneficial effect than when added to the vinyl ester resins. The cyclic performance at the 131 MPa hoop stress level is improved by more than 1000% by the addition of 8% (2.38 wt % of the total composite weight) of a strain relieving polymer to a polyester. The burst strength is increased about 50%.

TABLE 5
FATIGUE LIFE AND BURST STRENGTH FOR COMPOSITES MADE WITH UNSATURATED POLYESTER RESIN, STRAIN RELIEVING POLYMER AND IN-LINE OR OVEN DRIED CONTINUOUS GLASS FILAMENTS

| | |
|---|---|
| Glass Process: | Oven dried |
| Glass: | Glass #1 |
| Resin: | Resin B |
| SRP: | SRP I |
| Peroxide: | USP-245 |

| Composition | | |
|---|---|---|
| Glass, wt %: | 70.00 | 70.00 |
| Resin, wt %: | 29.70 | 27.32 |
| SRP, wt %: | 0.00 | 2.38 |
| Peroxide, wt %: | 0.30 | 0.30 |
| Cycles to Failure at 131 MPa (19,000 psi) Hoop Stress | 409 | 9384 |
| Burst Strength | | |
| Burst Strength, MPa (psi) | 180.4 (26,164) | 297.3 (43,116) |

| | |
|---|---|
| Glass Process: | In-line dried |
| Glass: | Glass #5 |
| Resin: | Resin B |
| SRP: | SRP I |
| Peroxide: | USP-245 |

| Composition | | |
|---|---|---|
| Glass, wt %: | 70.00 | 70.00 |
| Resin, wt %: | 29.70 | 27.32 |
| SRP, wt %: | 0.00 | 2.38 |
| Peroxide, wt %: | 0.30 | 0.30 |
| Cycles to Failure at 131 MPa (19,000 psi) Hoop Stress | 265 | 3804 |
| Burst Strength | | |
| Burst Strength, MPa (psi) | 174.6 (25,318) | 258.8 (37,541) |

Example 6

The data in Table 6 show that other strain relieving polymers exhibit behavior similar to UCC&P LP-90. Two materials, CX-1185 and CX-1752 from OCF improve the cyclic and burst performance of vinyl ester resin. CX-1185 is a PVAc methyl methacrylate and methacrylic acid terpolymer. CX-1752 is a polyester made primarily with ethylene glycol, propylene glycol and adipic acid. The results in Table 6 illustrate that a variety of different types of strain relieving polymers can be employed in the process of the present invention.

TABLE 6
FATIGUE LIFE AND BURST STRENGTH FOR COMPOSITES MADE WITH VINYL ESTER RESIN, OVEN DRIED CONTINUOUS GLASS FIBERS AND DIFFERENT STRAIN RELIEVING POLYMERS

| | |
|---|---|
| Glass Process: | Oven dried |
| Glass: | Glass #1 |
| Resin: | Resin A |
| SRP: | SRP I |
| Peroxide: | USP-245 |

| Composition | | | |
|---|---|---|---|
| Glass, wt %: | 67.8 | 67.8 | 67.8 |
| Resin, wt %: | 31.8 | 31.8 | 31.8 |
| SRP, wt %: | 0.00 | 1.23 | 2.36 |
| Peroxide, wt %: | 0.32 | 0.32 | 0.32 |
| Cycles to Failure at 131 MPa (19,000 psi) Hoop Stress | 23,405 | 93,245 | 125,528 |
| Burst Strength | | | |
| Burst Strength, MPa (psi) | 373.3 (54,143) | 511.2 (74,145) | — — |

| | |
|---|---|
| Glass Process: | Oven dried |
| Glass: | Glass #1 |
| Resin: | Resin A |
| SRP: | SRP II |
| Peroxide: | USP-245 |

| Composition | | | |
|---|---|---|---|
| Glass, wt %: | 67.8 | 67.8 | 67.8 |
| Resin, wt %: | 31.8 | 31.8 | 31.8 |
| SRP, wt %: | 0.00 | 1.23 | 2.36 |
| Peroxide, wt %: | 0.32 | 0.32 | 0.32 |
| Cycles to Failure at 131 MPa (19,000 psi) Hoop Stress | 23,405 | 55,685 | 199,841 |
| Burst Strength | | | |
| Burst Strength, MPa (psi) | 373.3 (54,143) | 443.0 (64,256) | 560.4 (81,272) |

| | |
|---|---|
| Glass Process: | Oven dried |
| Glass: | Glass #1 |
| Resin: | Resin A |
| SRP: | SRP IX |
| Peroxide: | USP-245 |

| Composition | | | |
|---|---|---|---|
| Glass, wt %: | 67.8 | 67.8 | 67.8 |
| Resin, wt %: | 31.8 | 31.8 | 31.8 |
| SRP, wt %: | 0.00 | 1.23 | 2.36 |
| Peroxide, wt %: | 0.32 | 0.32 | 0.32 |
| Cycles to Failure at 131 MPa (19,000 psi) Hoop Stress | 23,405 | 41,798 | 73,956 |
| Burst Strength | | | |
| Burst Strength, MPa (psi) | 373.3 (54,143) | 466.1 (67,604) | 511.2 (74,145) |

| | |
|---|---|
| Glass Process: | Oven dried |
| Glass: | Glass #1 |
| Resin: | Resin A |
| SRP: | SRP III |
| Peroxide: | USP-245 |

| Composition | | |
|---|---|---|
| Glass, wt %: | 70.00 | 70.00 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa | 26,000 | 41,523 |

TABLE 6-continued
FATIGUE LIFE AND BURST STRENGTH FOR COMPOSITES MADE WITH VINYL ESTER RESIN, OVEN DRIED CONTINUOUS GLASS FIBERS AND DIFFERENT STRAIN RELIEVING POLYMERS (19,000 psi) Hoop Stress

| | | |
|---|---|---|
| Glass Process: | In line dried | |
| Glass: | Glass #6 | |
| Resin: | Resin A | |
| SRP: | SRP III | |
| Peroxide: | USP-245 | |
| Composition | | |
| Glass, wt %: | 70.0 | 70.0 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 40,500 | 55,840 |

| | | |
|---|---|---|
| Glass Process: | Oven dried | |
| Glass: | Glass #1 | |
| Resin: | Resin A | |
| SRP: | SRP IV | |
| Peroxide: | USP-245 | |
| Composition | | |
| Glass, wt %: | 70.0 | 70.0 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 26,000 | 27,360 |

| | | |
|---|---|---|
| Glass Process: | In-line dried | |
| Glass: | Glass #6 | |
| REsin: | Resin A | |
| SRP: | SRP IV | |
| Peroxide: | USP-245 | |
| Composition | | |
| Glass, wt %: | 70.00 | 70.00 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 40,500 | 52,723 |

| | | |
|---|---|---|
| Glass Process: | Oven dried | |
| Glass: | Glass #1 | |
| Resin: | Resin A | |
| SRP: | SRP V | |
| Peroxide: | USP-245 | |
| Composition | | |
| Glass, wt %: | 70.0 | 70.0 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi Hoop Stress | 26,000 | 30,924 |

| | | |
|---|---|---|
| Glass Process: | In-line dried | |
| Glass: | Glass #6 | |
| Resin: | Resin A | |
| SRP: | SRP V | |
| Peroxide, wt %: | USP-245 | |
| Composition | | |
| Glass, wt %: | 70.0 | 70.0 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 40,500 | 37,206 |

| | | |
|---|---|---|
| Glass Process: | In-line dried | |
| Glass: | Glass #1 | |
| Resin: | Resin A | |
| SRP: | SRP VI | |
| Peroxide: | USP-245 | |
| Composition | | |
| Glass, wt %: | 70.0 | 70.0 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 26,000 | 22,803 |

| | | |
|---|---|---|
| Glass Process: | Oven dried | |
| Glass: | Glass #6 | |
| Resin: | Resin A | |
| SRP: | SRP VI | |
| Peroxide: | USP-245 | |
| Composition | | |
| Glass, wt %: | 70.00 | 70.00 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 40,500 | 24,921 |

| | | |
|---|---|---|
| Glass Process: | Oven dried | |
| Glass: | Glass #1 | |
| Resin: | Resin A | |
| SRP: | SRP I | |
| Peroxide: | USP-245 | |
| Composition | | |
| Glass, wt %: | 70.0 | 70.0 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 26,000 | 55,400 |

| | | |
|---|---|---|
| Glass Process: | In-line dried | |
| Glass: | Glass #6 | |
| Resin: | Resin A | |
| SRP: | SRP I | |
| Peroxide: | USP-245 | |
| Composition | | |
| Glass, wt %: | 70.00 | 70.00 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 40,500 | 105,600 |

| | | |
|---|---|---|
| Glass Process: | Oven dried | |
| Glass: | Glass #1 | |
| Resin: | Resin A | |
| SRP: | SRP VII | |
| Peroxide: | USP-245 | |
| Composition | | |
| Glass, wt %: | 70.00 | 70.00 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 26,000 | 830 |

| | | |
|---|---|---|
| Glass Process: | In-line dried | |
| Glass: | Glass #6 | |
| Resin: | Resin A | |
| SRP: | SRP VII | |
| Peroxide: | USP-245 | |
| Composition | | |
| Glass, wt %: | 70.00 | 70.00 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 40,500 | 250 |

| | |
|---|---|
| Glass Process: | Oven dried |
| Glass: | Glass #1 |
| Resin: | Resin A |
| SRP: | SRP VIII |
| Peroxide: | USP-245 |

Composition

TABLE 6-continued
FATIGUE LIFE AND BURST STRENGTH FOR COMPOSITES MADE WITH VINYL ESTER RESIN, OVEN DRIED CONTINUOUS GLASS FIBERS AND DIFFERENT STRAIN RELIEVING POLYMERS

| Glass, wt %: | 70.0 | 70.0 |
|---|---|---|
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 26,000 | 21,000 |

| | |
|---|---|
| Glass Process: | In-line dried |
| Glass: | Glass #6 |
| Resin: | Resin A |
| SRP: | SRP VIII |
| Peroxide: | USP-245 |

| Composition | | |
|---|---|---|
| Glass, wt %: | 70.00 | 70.00 |
| Resin, wt %: | 29.70 | 28.51 |
| SRP, wt %: | 0.00 | 1.19 |
| Peroxide, wt %: | 0.30 | 0.30 |
| Cycles to Failure at 131 MPa (19,000 psi) Hoop Stress | 40,500 | 36,100 |

Example 7

Table 7 records the results of Split-D tests after exposure to various corrosive media. The table shows the results obtained using oven and in-line dried glass fibers. The results in Table 7 illustrate that the addition of a strain relieving polymer at levels up to 12 wt % of the resin weight does not significantly affect corrosion resistance in aqueous corrosive media. When the corrosive media is a fuel mixture (a known highly corrosive media), the corrosion resistance of the composite is maintained when somewhat lower levels of the strain relieving polymer are added to the composite.

TABLE 7
SPLIT-D TEST ON COMPOSITES MADE WITH VINYL ESTER RESIN, STRAIN RELIEVING POLYMER AND OVEN OR IN-LINE DRIED CONTINUOUS GLASSFIBERS SUBJECTED TO DIFFERENT CORROSIVE MEDIA

| | |
|---|---|
| Glass Process: | Oven dried |
| Glass: | Glass #1 |
| Resin: | Resin A |
| SRP: | SRP I |
| Peroxide: | USP-245 |

| Composition | | | | |
|---|---|---|---|---|
| Glass, wt %: | 66.6 | 65.5 | 64.5 | 65.3 |
| Resin, wt %: | 33.1 | 34.16 | 32.54 | 30.67 |
| SRP, wt %: | 0.00 | 1.37 | 2.60 | 3.68 |
| Peroxide, wt %: | 0.35 | 0.35 | 0.36 | 0.35 |
| Dry Tensile, MPa | 358.7 | 344.2 | 357.5 | 356.5 |
| (psi) | (52,018) | (49,925) | (51,844) | (51,702) |
| Tensile Strength Retention, % | | | | |
| 10 Day Boil De-ionized H2O | 71.7 | 77.5 | 74.9 | 75.0 |
| 10 Day Boil 1.0% NaOH | 68.6 | 67.7 | 69.1 | 64.4 |
| 10 Day Boil 1.0% H2SO4 | 65.6 | 80.7 | 73.5 | 67.9 |
| 10 Day Boil 10.0% CaCl2 | 71.7 | 77.5 | 74.9 | 75.0 |
| 10 Day Room Temperature Fuel Mix* | 94.5 | 97.8 | 83.7 | 65.9 |

| | |
|---|---|
| Glass Process: | In-line dried |
| Glass: | Glass #7 |
| Resin: | Resin A |
| SRP: | SRP I |
| Peroxide: | USP-245 |

| Composition | | | | |
|---|---|---|---|---|
| Glass, wt %: | 70.9 | 71.5 | 70.2 | 67.9 |
| Resin, wt %: | 28.81 | 27.13 | 27.32 | 28.38 |
| SRP, wt %: | 0.00 | 1.09 | 2.19 | 3.41 |
| Peroxide, wt %: | 0.29 | 0.29 | 0.3 | 0.32 |

TABLE 7-continued
SPLIT-D TEST ON COMPOSITES MADE WITH VINYL ESTER RESIN, STRAIN RELIEVING POLYMER AND OVEN OR IN-LINE DRIED CONTINUOUS GLASSFIBERS SUBJECTED TO DIFFERENT CORROSIVE MEDIA

| | | | | |
|---|---|---|---|---|
| Dry Tensile MPa | 393.5 | 372.8 | 364.5 | 367.8 |
| (psi) | (57,076) | (54,065) | (52,859) | 53,349) |
| Tensile Strength Retention (%) | | | | |
| 10 Day Boil De-ionized H2O | 78.3 | 93.1 | 84.7 | 83.8 |
| 10 Day Boil 1.0% NaOH | 80.1 | 88.6 | 81.5 | 76.9 |
| 10 Day Boil 1.0% H2SO4 | 80.1 | 89.7 | 82.3 | 81.2 |
| 10 Day Boil 10.0% CaCl2 | 78.3 | 93.1 | 84.7 | 83.8 |
| 10 Day Room Temperature Fuel Mix* | 93.9 | 94.0 | 86.0 | 68.4 |

*90% unleaded BP gasoline plus 10% methanol.

We claim:

1. In a process for forming a reinforced resin composite article, comprising the following steps:
   a) coating at least one continuous filament with a thermosetting mixture comprising:
      i) a resin selected from the group consisting of unsaturated polyester resins, vinyl ester resins, and mixtures thereof;
      ii) a sytrene monomer; and
      iii) a thermoplastic polymer; and
   b) subjecting the resulting coated filament(s) to a filament winding or protrusion treatment of form said coated filament into a desired shape and cure the thermosetting mixture;
   the improvement wherein the thermoplastic polymer comprises a polyvinylacetate homopolymer.

2. The process of claim 1 wherein said at least one continuous filament is selected from the group consisting of polyaramid fiber, graphite fiber, boron fiber, glass fiber, and mixtures thereof.

3. The process of claim 2 wherein said at least one continuous filament is glass fiber.

4. The process of claim 3 wherein said at least one continuous filament is glass fiber made by the in-line drying process.

5. The process of claim 1 wherein the thermosetting mixture further comprises a curing catalyst.

6. The process of claim 5 wherein sad catalyst is selected from the group consisting of organic peroxides, organic hydroperoxides, and azo compounds.

7. In a process for forming a reinforced resin composite article, comprising the following steps:
   a) coating at least one continuous glass filament with a thermosetting mixture comprising:
      i) a resin selected from the group consisting of unsaturated polyester resins, vinyl ester resins, and mixtures thereof;
      ii) a styrene monomer and
      iii) a thermoplastic polymer; and
   b) subjecting the resulting coated filament to a filament winding or protrusion treatment to form said coated filament(s) into a desired shape and cure the thermosetting mixture;
   the improvement wherein the thermosplastic polymer comprises a polyvinylacetate homopolymer and the continuous glass filament is made by an in-line drying process.

8. The process of claim 7 wherein said thermosetting mixture further comprises a curing catalyst.

9. The process of claim 8 wherein said catalyst is selected from the group consisting of organic peroxides, organic hydroperoxides, and azo compounds.

10. A composite article made by the process of claim 1.

11. A composite article made by the process of claim 7.

* * * * *